US012634586B2

(12) United States Patent
Jennings et al.

(10) Patent No.: US 12,634,586 B2
(45) Date of Patent: May 19, 2026

(54) UNMANNED AERIAL VEHICLE SYSTEM FOR PROVIDING SHADE AND LIGHT

(71) Applicant: United States of America as represented by the Secretary of the Navy, San Diego, CA (US)

(72) Inventors: Daniel S. Jennings, San Diego, CA (US); Mark Bilinski, San Diego, CA (US); Danielle R. Matusiak, San Diego, CA (US); Robert C. Rocha, San Diego, CA (US)

( * ) Notice: Subject to any disclaimer, the term of this patent is extended or adjusted under 35 U.S.C. 154(b) by 265 days.

(21) Appl. No.: 18/307,636

(22) Filed: Apr. 26, 2023

(65) Prior Publication Data

US 2024/0365009 A1 Oct. 31, 2024

(51) Int. Cl.
| | |
|---|---|
| *H04N 23/72* | (2023.01) |
| *B64D 47/02* | (2006.01) |
| *B64F 1/36* | (2024.01) |
| *B64U 10/13* | (2023.01) |
| *B64U 70/90* | (2023.01) |
| *B64U 101/30* | (2023.01) |
| *H04N 23/74* | (2023.01) |

(52) U.S. Cl.
CPC ............. *H04N 23/72* (2023.01); *B64D 47/02* (2013.01); *B64F 1/362* (2013.01); *B64U 10/13* (2023.01); *B64U 70/90* (2023.01); *H04N 23/74* (2023.01); *B64U 2101/30* (2023.01)

(58) Field of Classification Search
CPC ........ H04N 23/60; H04N 23/72; B64U 10/13; B64D 47/02
See application file for complete search history.

(56) References Cited

U.S. PATENT DOCUMENTS

| | | | | |
|---|---|---|---|---|
| 10,997,668 | B1 * | 5/2021 | Freeman | .............. H04N 13/254 |
| 11,136,096 | B2 * | 10/2021 | Moses | ..................... G01S 19/45 |
| 11,861,896 | B1 * | 1/2024 | Wang | ........................ G06T 5/94 |
| 2015/0378178 | A1 * | 12/2015 | Yang | ........................ G02C 7/12 |
| | | | | 351/159.56 |
| 2016/0340006 | A1 * | 11/2016 | Tang | ........................ B63C 9/01 |
| 2017/0313416 | A1 * | 11/2017 | Mishra | .................. G03B 15/03 |
| 2018/0094448 | A1 | 4/2018 | Davis | |
| 2020/0012296 | A1 * | 1/2020 | Gurdan | ............... G05D 1/0676 |

FOREIGN PATENT DOCUMENTS

WO WO-2021115175 A1 * 6/2021

* cited by examiner

*Primary Examiner* — Angela Y Ortiz
*Assistant Examiner* — Jack Robert Brewer
(74) *Attorney, Agent, or Firm* — Naval Information Warfare Center Pacific; Kyle Eppele

(57) ABSTRACT

An unmanned aerial vehicle (UAV) system comprising at least one UAV platform and a user system. Each UAV platform can comprise a first camera system and a shading system. The user system can comprise a targeting system and a second camera system. The targeting system can select a target, the first camera system can detect the location of the target and at least one light source, and each UAV platform can move to an intermediary location between the target and one of the at least one light sources. Additional embodiments can include a lighting system on the UAV platforms to illuminate targets.

3 Claims, 7 Drawing Sheets

107

101

105

103

UNMANNED AERIAL VEHICLE SYSTEM FOR PROVIDING SHADE AND LIGHT

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 112762) is assigned to the United States Government and is available for licensing for commercial purposes. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil.

BACKGROUND OF THE INVENTION

When utilizing photography for documentation or photogrammetry purposes, harsh sunlight can limit the quality of the pictures causing over exposed bright areas and under exposed shadows. Currently the only practical means of working around this issue is to limit data collection times to overcast conditions or early morning/evening hours. Similarly, lack of proper lighting in specific areas can make restrict the quality or accuracy of photography. What is needed is a convenient means of modifying light levels in an operating environment.

SUMMARY OF THE INVENTION

The present invention relates to a UAV system for shading and illuminating targets. According to an illustrative embodiment of the present disclosure, a UAV platform comprises: a first camera system comprising at least one camera; a shading system comprising at least one optical filter; and a lighting system comprising at least one light source; wherein the first camera system is configured to detect the location of a target and a light source; wherein the UAV platform is configured to move to an intermediary location between the target and the light source; wherein the UAV platform is configured to move to an intermediary location near the target and illuminate the target with the at least one light source.

According to a further illustrative embodiment of the present disclosure, a UAV system comprises: at least one first UAV platform each comprising a first camera system and a shading system; a user system comprising a targeting system and a second camera system; wherein the targeting system is configured to select a target; wherein the first camera system is configured to detect the location of the target and at least one light source; wherein each first UAV platform is configured to move to a first intermediary location between the target and one of the at least one light sources.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

Throughout the several views, like elements are referenced using like references. The elements in the figures are not drawn to scale and some dimensions are exaggerated for clarity.

The detailed description of the invention particularly refers to the accompanying figures in which.

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Figure 1:
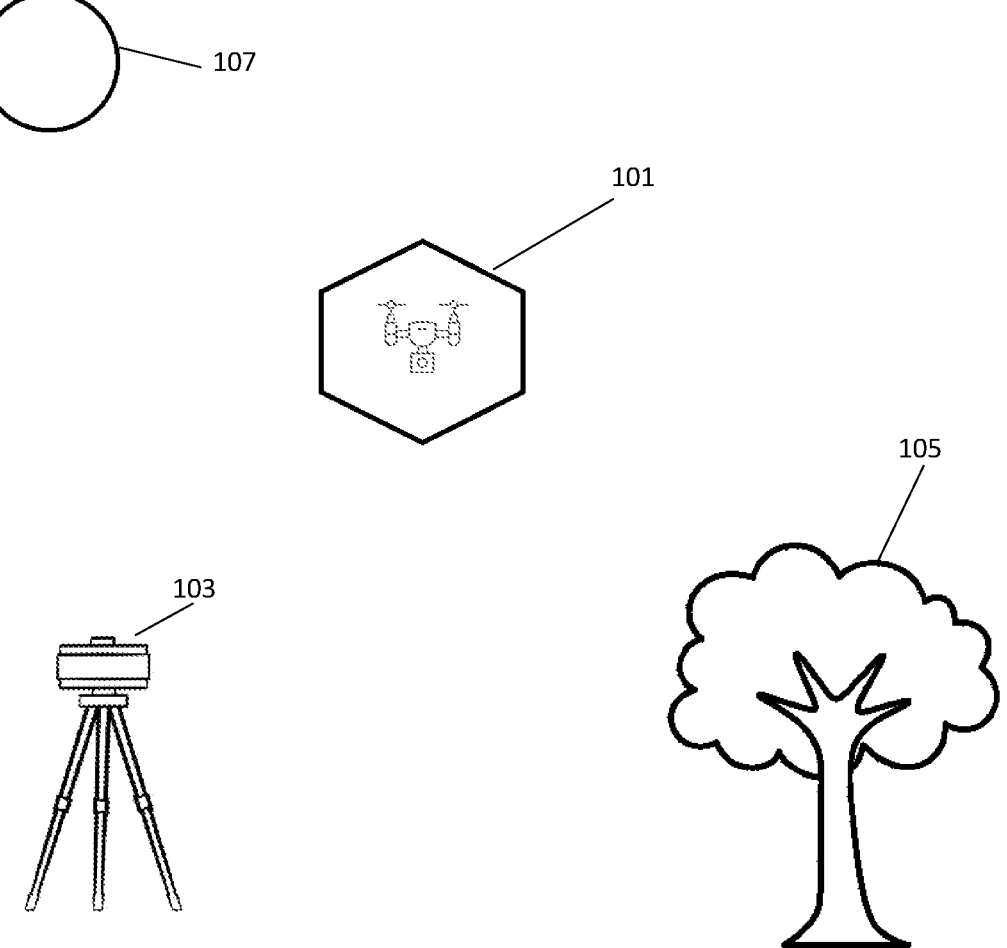
FIG. 1 shows an exemplary UAV system in an operating environment.

FIG. 1 shows an exemplary UAV system in an operating environment. A UAV platform 101 can be manually or automatically controlled to move around the operating environment. User system 103 can be used to photograph a target 105. User system 103 can be a stationary device (e.g., a camera mounted on a tripod), a moving device (e.g., a camera mounted on a ground vehicle), or a handheld device (e.g., a camera carried by or mounted to a user). User system 103 can let a user change targeting priorities for the UAV platform 101 to autonomously carry out or let a user manually position the UAV platform. User system 103 can include a processing center so that less processing hardware needs to be loaded onto UAV platforms 101. Target 105 can be an object, plurality of objects, or a general region (e.g., a cuboid). UAV platform 101 can be used to modify the lighting of target 105 such that the user system 103 can reliably photograph the target 105 at all times of day and irrespective of local lighting, weather, or other environmental conditions. UAV platform 101 can include light/optical filtering (e.g., neutral-density, absorbing, blocking, interfering, etc.) components (e.g., opaque or translucent) that block or limit the amount of light that reaches target 105. For example, if light source 107 (e.g., the sun, street lighting, reflected light, combustion, radio transmitters, etc.) is preventing target 105 from being reliably photographed (e.g., the light is too harsh causing the target to appear oversaturated), a UAV platform 101 can fly between the light source 107 and target 105 such that less light reaches target 105. In exemplary embodiments, light can include visible light or any other electromagnetic radiation (EMR). At least some exemplary embodiments will use neutral density optical filters to reduce the light intensity without affecting the overall distribution of wavelengths. Because a UAV platform 101 is capable of moving closer to light sources 107, light filtering components require less surface area to block light compared to ground-based shade generators. UAV platform 101 can move to an intermediary location sufficiently close to the light source 107 that the projected shade covers the target. Exemplary shade systems can provide static (e.g., light absorption remains constant throughout operation) or dynamic (e.g., light absorption remains can change throughout operation) shade. For dynamic shade systems, the light/optical filtering components can include components controlled through mechanical means (e.g., a plurality of filters that are deployed to change the light absorption) and components controlled through material means (e.g., a filter that is tuned by applying an electric current). For example, a shade system can use a plurality of filters that each remove about 10% of the light passing through; by deploying multiple filters concurrently, the total amount of light can be further reduced (e.g., six 10% filters overlaid would reduce the light by about 47%). Exemplary systems can use a plurality filters (e.g., at least one 50%, 25%, 12%, 6%, and 1% filters) to remove different amounts of light (e.g., combining two 50% filters). In other exemplary systems, a shade system can use an electrically tuned material to dim/opaque the material until the desired light reduction is reached. A camera system (e.g., at least one camera, EMR sensors, etc.) coupled to UAV platform 101 can identify the current lighting of a target 105 and the location of light sources 107, and the UAV platform 101 can move to an intermediary location between target 105 and a light source 107 if less light is needed.

Figure 2:
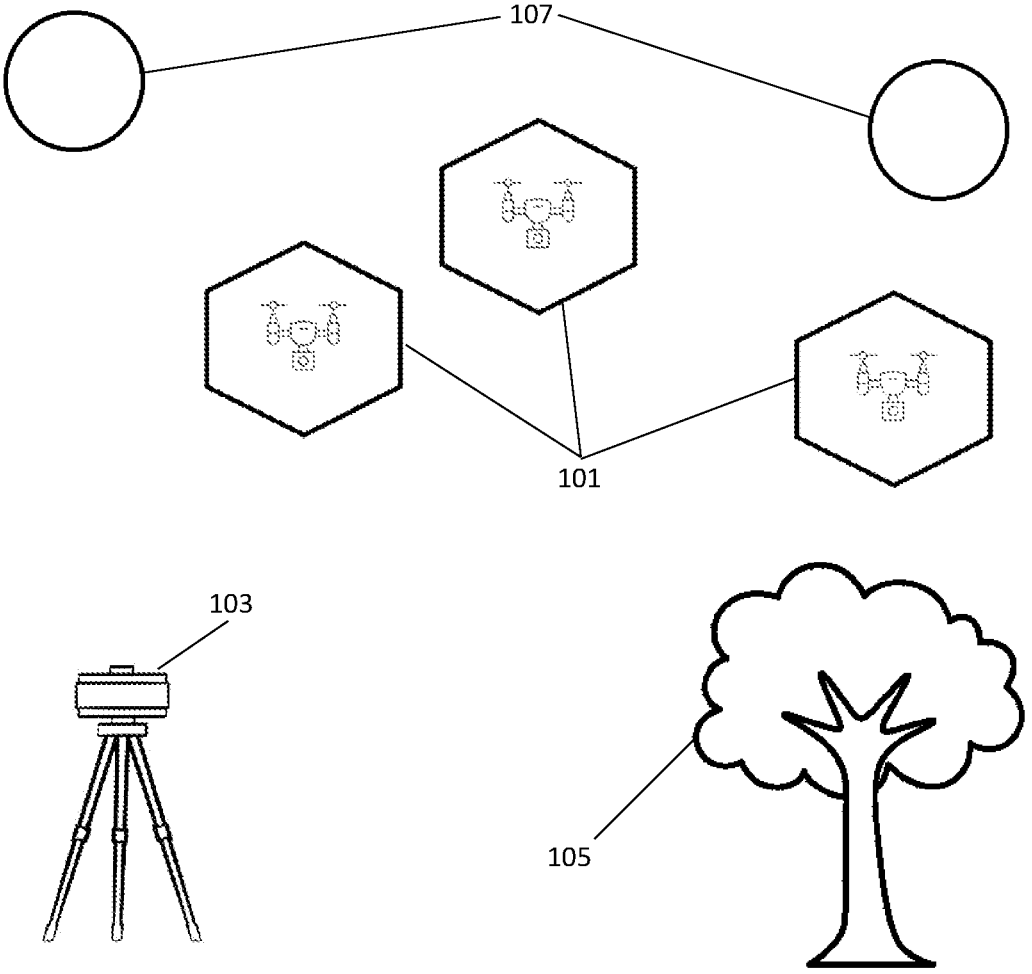
FIG. 2 shows an exemplary UAV system utilizing a plurality of UAVs.

FIG. 2 shows an exemplary UAV system utilizing a plurality of UAV platforms 101. A plurality of UAV platforms 101 allow better customization of lighting effects. Each UAV platform 101 can include light filtering components (e.g., opaque or translucent) that block or limit the amount of light that reaches target 105. For example, a plurality of UAV platforms 101 can shade a target 105 from multiple light sources 107. A plurality of UAV platforms can be spaced around on operating environment such that the time it takes a UAV platform to reach an intermediary location is short. A plurality of UAV platforms 101 can be used in parallel (i.e., the same intermediary location) to block light from a single light source 107 such that the combined shade sections lower the required proximity to the light source needed to create sufficient shade. For example, two UAV platforms 101 can fly adjacent to each other at an intermediary location such that their shade sections form a larger combined shade section. Compared to using a single UAV with a larger shade section, this approach can reduce size, weight, and power (SWAP) requirements for individual UAVs and increase the range of options available for specialized shade arrangements (e.g., forming shapes with specific light filtering at predetermined locations). A plurality of UAV platforms 101 can be used in series (i.e., separated intermediary locations) to block light from a single light source 107 such that each UAV platform blocks varying amounts of light to create customized shading. For example, a first UAV platform 101 at a first intermediary location can use a light/optical filter to block specific wavelengths of light while a second UAV platform at a second intermediary location can use an opaque filter to reduce the overall intensity of light reaching a target 105. Using a plurality of UAV platforms 101 creates redundancy so that if one UAV platform breaks or malfunctions, then operational capability is maintained.

Figure 3:
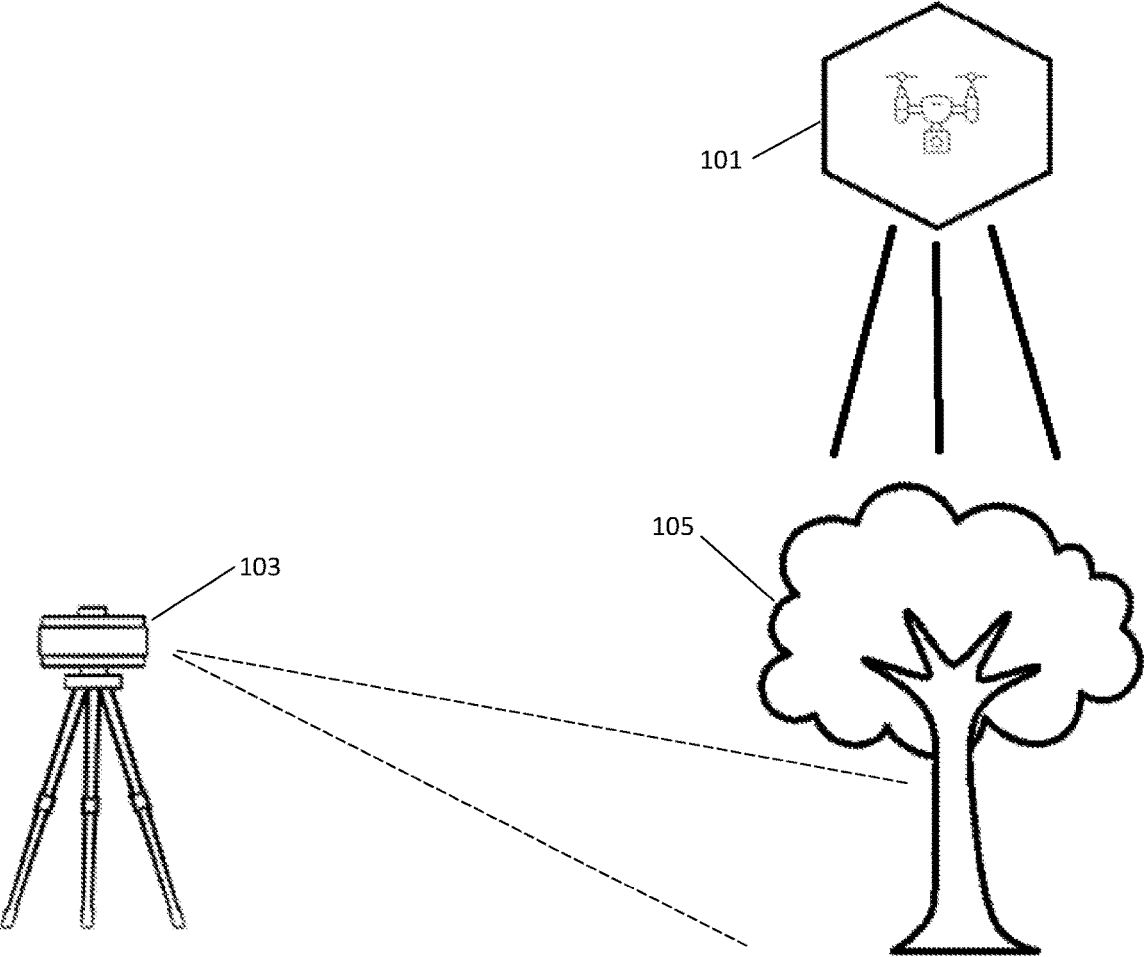
FIG. 3 shows an exemplary UAV system utilizing a lighting UAV.

FIG. 3 shows an exemplary UAV system utilizing a lighting UAV. UAV platform 101 can also include a lighting system to light specific targets 105 or features of target 105. For example, if insufficient light is reaching target 105 (e.g., the shade produced by UAV platform has obscured a feature of target, there is low-light operating environment, etc.), a lighting system on UAV platform 101 can illuminate a target 105 or specific features of a target 105. A lighting system can be configured to produce light across the entire visible spectrum or at specific wavelengths (e.g., producing red light wavelengths for nighttime applications, etc.). In at least some embodiments, a lighting system can produce non-visible EMR (e.g., infrared, etc.). In exemplary systems, user system 103 can include a targeting system (e.g., a laser source, a camera, etc.). The targeting system can be used to select/identify a target, and the target data can be transmitted to the UAV platform 101. UAV platform 101 can then move to a position at which it can shade or illuminate target 105 to the desired level. A camera system (e.g., at least one camera, EMR sensors, etc.) coupled to UAV platform 101 can identify the current lighting of a target 105, and the UAV platform 101 can move to an intermediary location near target 105 to illuminate the target if more light is needed. Exemplary targeting systems can include a laser source used to mark a target so that a sensor on a UAV platform can identify the target based on what the laser is pointed at. Exemplary targeting systems can include a laser source used to draw a target region (e.g., drawing a rectangle) so that a sensor on a UAV platform can identify the outline of the target region.

Figure 4:
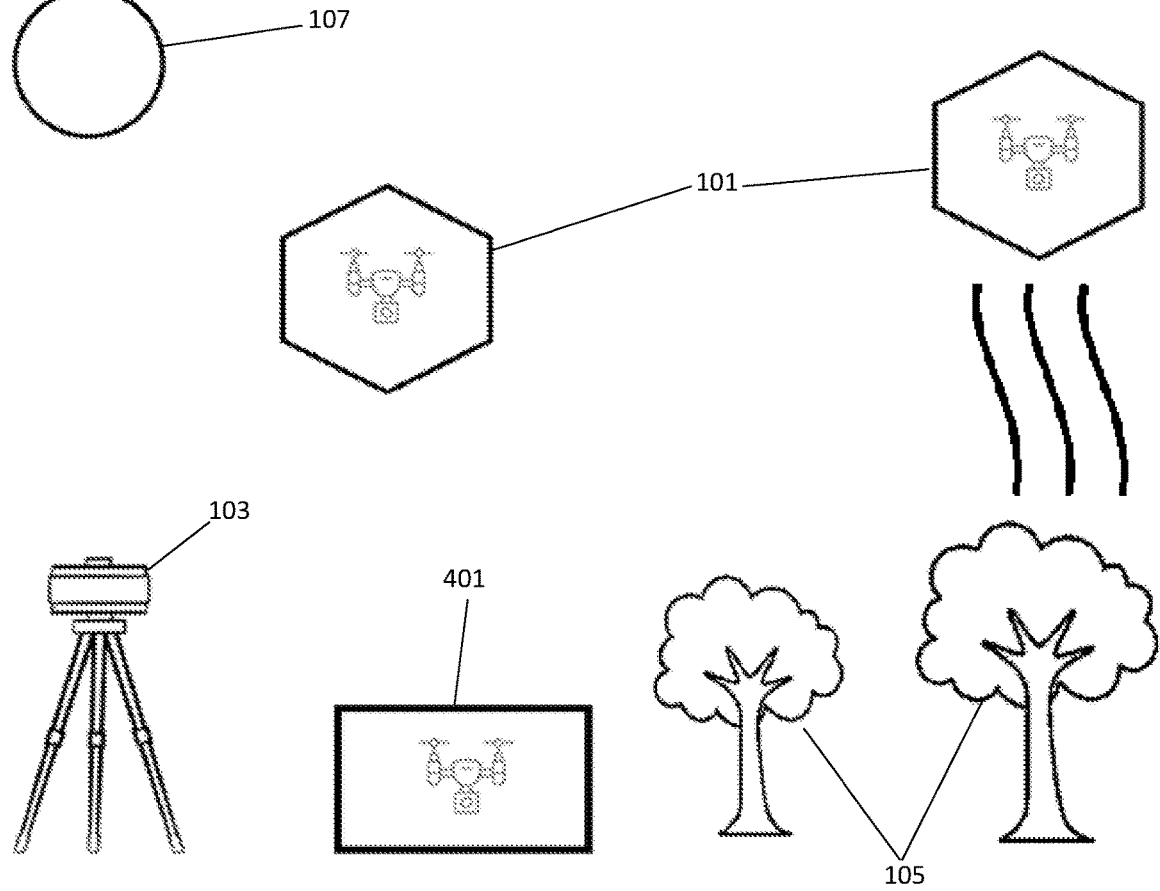
FIG. 4 shows an exemplary UAV system utilizing a plurality of UAVs for lighting and shading.

FIG. 4 shows an exemplary UAV system utilizing a plurality of UAVs for lighting and shading. UAV platform 101 can include light/optical filtering components (e.g., opaque or translucent) that block or limit the amount of light that reaches target 105. For example, if light source 107 is preventing target 105 from being reliably photographed (e.g., the light is too harsh, causing the target to appear oversaturated), a UAV platform 101 can fly between the light source 107 and target 105 such that less light reaches target 105. UAV platform 101 can also include a lighting system to light specific targets 105 or features of target 105. For example, if insufficient light is reaching target 105 (e.g., the shade produced by UAV platform has obscured a feature of target, there is low-light operating environment, etc.), a lighting system on UAV platform 101 can illuminate target 105 or specific features of target 105. In exemplary systems, individual UAV platforms 101 can be specialized to have either shade producing or light producing systems/components. UAV platform specialization can improve the operating efficiency of individual UAV platform but lowering the SWAP requirement of each individual unit at the cost of lowering the operating flexibility of individual platforms (e.g., if light is needed at a location, a platform with lighting systems may take longer to reach the location comparing to other platforms). In contrast, including lighting systems on every UAV platforms can allow the system to react to changing environmental conditions faster because any platform can fulfill the need to produce light, and including shading systems on every UAV platforms can allow the system to react to changing environmental conditions faster because any platform can fulfill the need to produce shade. A camera system (e.g., at least one camera, EMR sensors, etc.) coupled each UAV platform 101 can identify the current lighting of a target 105, and UAVs platform 101 can move to an intermediary location near target 105 to illuminate the target if more light is needed or move to an intermediary location between target 105 and a light source 107 if less light is needed. If UAV platforms 101 are specialized to perform either shade or lighting but not both, then each UAV platform will move to intermediary locations matching their respective functions. Exemplary UAV systems can also include a ground system 401. Ground system 401 can be used to dock unused UAV platforms 101. Ground system 401 can include a power system that charges docked UAV platforms 101. If a target 105 is identified to need shade or lighting and no UAV platforms 101 capable of fulfilling that need are available, a UAV platform 101 can launch from ground system 401. Ground system 401 can include a processing center so that less processing hardware needs to be loaded onto UAV platforms 101. If there are multiple targets 105, each UAV platform 101 can choose a particular target or be assigned a particular target to shade/illuminate.

Figure 5:
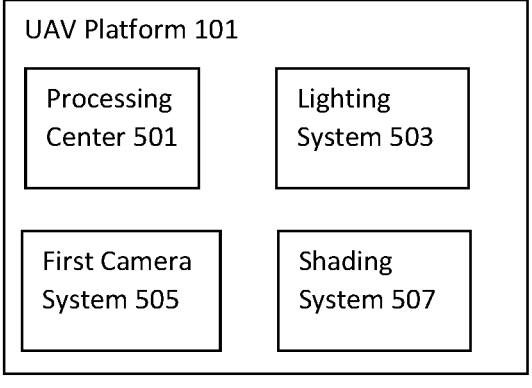
FIG. 5 shows a block diagram of an exemplary UAV system.
Figure 5:
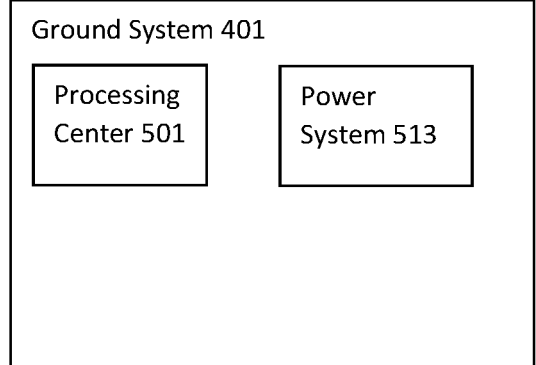
Figure 5:
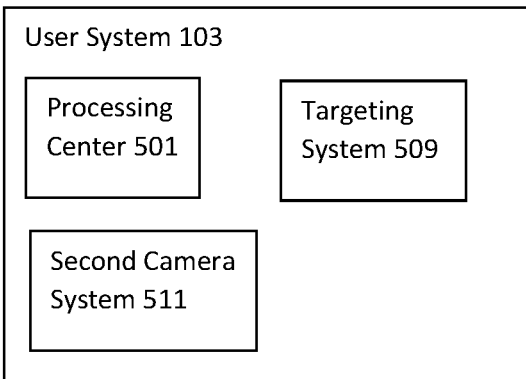

FIG. 5 shows a block diagram of an exemplary UAV system. UAV platform 101 can include a processing center 501, lighting system 503, a first camera system 505, and shading system 507. Processing centers 501 can be hosted on a single system (UAV platform, user system, or ground system) or hosted on multiple devices concurrently. Including a processing center 501 on user system 103 and/or ground system 401 can lower the need for processing hardware loaded on UAV platforms 101. A lighting system 503 on UAV platform 101 can illuminate a target or specific features of a target. A lighting system 503 can be configured to produce light across the entire visible spectrum or at specific wavelengths (e.g., producing red light wavelengths for nighttime applications). A first camera system 505 (e.g., at least one camera, EMR sensors, etc.) coupled each UAV platform 101 can identify the current lighting of a target, and UAVs platform 101 can move to an intermediary location near the target to illuminate the target if more light is needed or move to an intermediary location between target and a light source if less light is needed. Exemplary shade systems 507 can provide static (e.g., the light absorption remains constant throughout operation) or dynamic (e.g., the light absorption remains can change throughout operation) shade. For dynamic shade systems 507, the light absorbing components can include mechanically controlled (e.g., a plurality of filters that are deployed to change the light absorption) and materially controlled (e.g., a filter that is tuned by applying an electric current) components.

User system 103 can include a processing center 501, a targeting system 509, and a second camera system 511. A targeting system 509 (e.g., a laser source, a camera, etc.) can be used to select/identify a target, and the target data can be transmitted to the UAV platform 101. Exemplary targeting systems 509 can include a laser source used to mark a target so that a sensor in first camera system 505 can identify the target based on what the laser is pointed at. Exemplary targeting systems 509 can include a laser source used to draw a target region (e.g., drawing a rectangle) so that a sensor in first camera system 505 can identify the outline of the target region. Exemplary targeting systems 509 can identify a target so that user system 103 can transmit target information to UAV platforms 101. A second camera system 511 (e.g., at least one camera, EMR sensors, etc.) can be used to photograph/record a target, identify the current lighting of a target, and determine the distance between user system 103 and a target. Ground system 401 can include a processing center 501 and power system 513. Ground system 401 can include a power system that charges docked UAV platforms 101.

Figure 6:
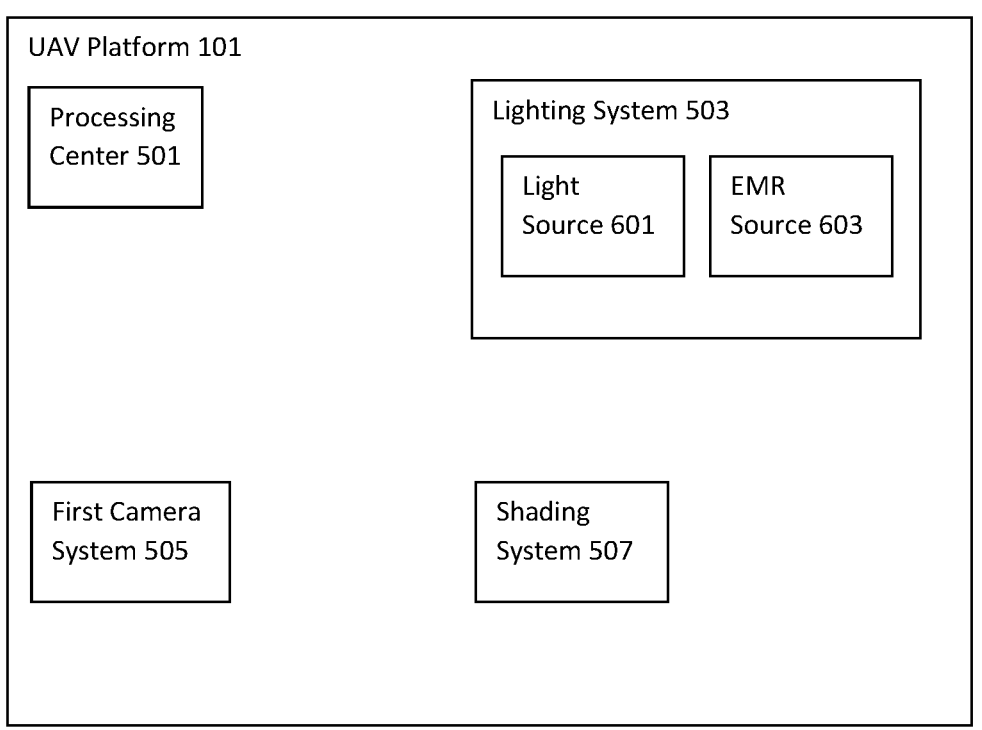
FIG. 6 shows a block diagram of an exemplary UAV platform.

FIG. 6 shows a block diagram of an exemplary UAV platform 101. Lighting system 501 can include a visible light source 601 and/or an EMR source (e.g., an infrared light source, etc.) 603.

Figure 7:
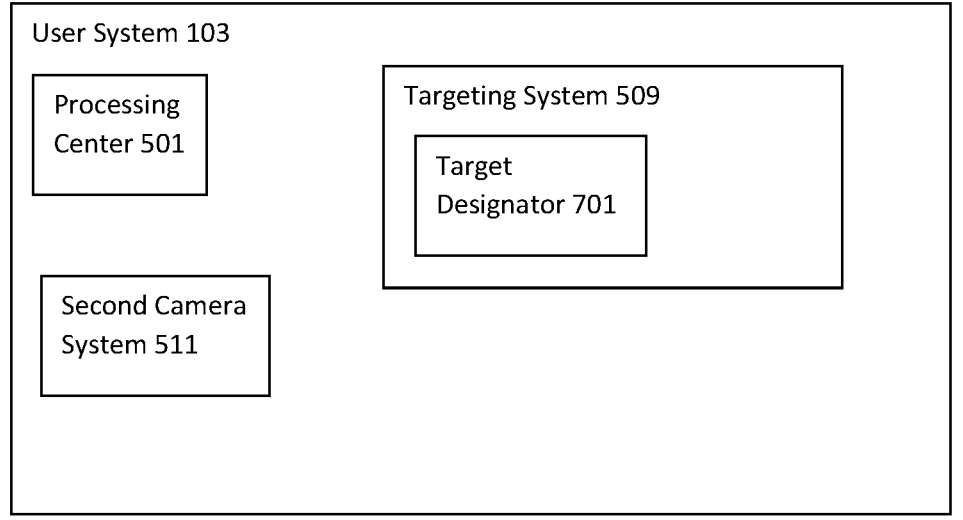
FIG. 7 shows a block diagram of an exemplary user system.

FIG. 7 shows a block diagram of an exemplary user system 103. Targeting system 509 can include a target designator 701 (e.g., an infrared laser, etc.).

Although the invention has been described in detail with reference to certain preferred embodiments, variations and modifications exist within the spirit and scope of the invention as described and defined in the following claims.

The invention claimed is:

1. An unmanned aerial vehicle (UAV) system comprising:
   at least one first UAV platform each comprising a first camera system comprising
   at least one camera and a shading system comprising at least one optical filter;
a user system comprising a targeting system and a second camera system; and a ground system,
   wherein the targeting system is configured to select a target,
   wherein the first camera system is configured to detect the location of the target,
   wherein each first UAV platform is configured to move to a first intermediary location based on targeting data provided by the user system,
   wherein the at least one optical filter comprises a plurality of optical filters, and
   wherein each optical filter of the plurality of optical filters is configured to filter a distinct set of wavelengths or intensities of light,
   wherein the at least one optical filter comprises a light absorbing material selected from neutral-density materials, electrochromic materials, or wavelength-specific absorbers,
   wherein the first UAV platform and a second UAV platform operate in tandem to balance illumination effects in real time based on environmental lighting conditions,
   wherein the first UAV platform is configured to move to a position based on a real-time assessment of the position and intensity of an artificial light source mounted on the second UAV platform, and
   wherein the shading system of the first UAV platform is configured to cast a shadow between the target and the artificial light source to modulate lighting conditions for imaging.

2. The UAV system of claim 1,
   wherein the at least one first UAV platform each further comprising a lighting system comprising at least one light source,
   wherein the at least one first UAV platform is configured to move to a second intermediary location near the target and illuminate the target with the at least one light source,
   wherein the lighting system is configured to modulate illumination intensity or wavelength based on sensed environmental conditions, and,
   wherein the first and second UAV platforms operate in tandem to dynamically balance both shading and artificial illumination in real time based on environmental lighting conditions.

3. The UAV system of claim 2, wherein the ground system further comprises a power system configured to charge docked UAV platforms and a processing center configured to coordinate the real-time balancing of shading and artificial illumination by the first and second UAV platforms based on environmental lighting conditions.

* * * * *